United States Patent [19]
Yaginuma

[11] Patent Number: 6,125,230
[45] Date of Patent: Sep. 26, 2000

[54] MAGNETIC TAPE RECORDING AND REPRODUCING APPARATUS FOR VIDEO SIGNAL

[75] Inventor: Takahiko Yaginuma, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,350

[22] Filed: Sep. 4, 1996

[30] Foreign Application Priority Data

Sep. 5, 1995 [JP] Japan ................................ 7-228255

[51] Int. Cl.⁷ .............................................. H04N 5/76
[52] U.S. Cl. ............................................. 386/83; 386/92
[58] Field of Search ................................ 386/46, 52, 83, 386/92, 123, 96, 66, 122; 348/731, 565, 556; H04N 5/76

[56] References Cited

U.S. PATENT DOCUMENTS

| | | | |
|---|---|---|---|
| 4,326,220 | 4/1982 | Mogi | 348/731 |
| 4,602,297 | 7/1986 | Reese | 386/52 |
| 4,737,993 | 4/1988 | DeVilbiss | 348/731 |
| 4,761,688 | 8/1988 | Hakamada | 348/565 |
| 4,774,597 | 9/1988 | Harvey | 386/92 |
| 4,845,564 | 7/1989 | Hakamada et al. | 348/565 |
| 5,034,819 | 7/1991 | Tsukagoshi | 348/731 |
| 5,146,331 | 9/1992 | Tsuchida | 348/556 |
| 5,187,589 | 2/1993 | Kono et al. | 386/92 |
| 5,193,005 | 3/1993 | Tomota | 348/731 |
| 5,285,284 | 2/1994 | Takashima et al. | 348/731 |
| 5,386,325 | 1/1995 | Kim | 386/66 |
| 5,428,454 | 6/1995 | Kimura et al. | 386/123 |
| 5,483,277 | 1/1996 | Granger | 348/10 |
| 5,572,332 | 11/1996 | Shin | 386/96 |

*Primary Examiner*—Huy Nguyen
*Attorney, Agent, or Firm*—Frommer Lawrence & Haug, LLP.; William S. Frommer

[57] ABSTRACT

A magnetic tape recording and reproducing apparatus for a video signal which can record the ground-wave television broadcasting of different channels on different magnetic tapes and can prevent the change of the reception channel at one of first and second magnetic tape recording and reproducing decks for a video signal from affecting the reception channel of the other thereof. The magnetic tape recording and reproducing apparatus for a video signal includes first and second magnetic tape recording and reproducing decks for a video signal and first and second television tuners for receiving a ground wave.

7 Claims, 2 Drawing Sheets

MAGNETIC TAPE RECORDING AND REPRODUCING APPARATUS FOR VIDEO SIGNAL

BACKGROUND OF THE INVENTION

1. Field of the Invention

The present invention relates to a magnetic tape recording and reproducing apparatus for a video signal.

2. Description of the Related Art

These kinds of magnetic tape recording and reproducing apparatus for video signals (i.e., VTRS) have been available on a market: a magnetic tape recording and reproducing apparatus for a video signal (VTR) having a pair of magnetic tape recording and reproducing decks for video signals and one television tuner for receiving a ground wave; and a magnetic tape recording and reproducing apparatus for a video signal (VTR) having one magnetic tape recording and reproducing deck for a video signal and a pair of television tuners for receiving ground waves. Moreover, these magnetic tape recording and reproducing apparatus for video signals having tuners for receiving a satellite broadcasting have been available on a market.

With the above VTRs, it is impossible to simultaneously record ground-wave television broadcastings of different channels on respective magnetic tapes. When the former VTR is used and one deck thereof is supplied with and records a signal received by an incorporated television tuner, if a deck being controlled is changed from the one deck to the other deck and the other deck is controlled to change the reception channel, a reception channel of the one deck being engaged in the recording is also changed, which disadvantageously prevents the reception channel of the other deck from being changed.

SUMMARY OF THE INVENTION

In view of such aspects, an object of the present invention is to provide a magnetic tape recording and reproducing apparatus for a video signal which can record ground-wave television broadcastings of different channels on respective magnetic tapes and can prevent change of a reception channel of one deck from affecting a reception channel of the other deck.

According to the present invention, a magnetic tape recording and reproducing apparatus for a video signal includes first and second magnetic tape recording and reproducing decks for a video signal and first and second television tuners for receiving a ground wave.

According to the present invention, it is possible for the first and second magnetic tape recording and reproducing decks for a video signal to independently record television broadcastings of different channels or the same channel received by the first and second television tuners for receiving a ground wave.

DESCRIPTION OF THE PREFERRED EMBODIMENT

Figure 1:
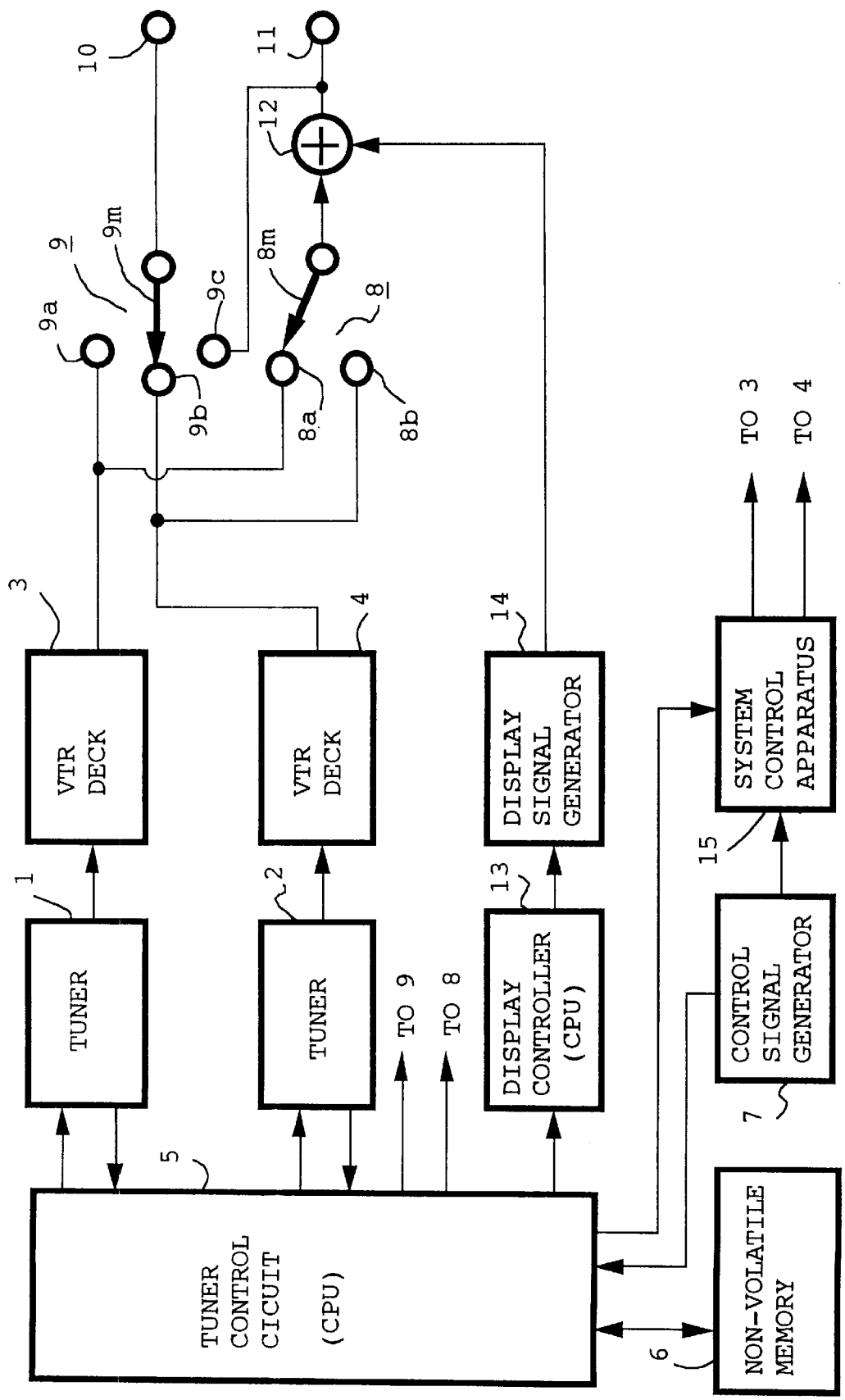
FIG. 1 is a block diagram showing a circuit arrangement of a magnetic tape recording and reproducing apparatus for a video signal according to an embodiment of the present invention.
Figure 2:
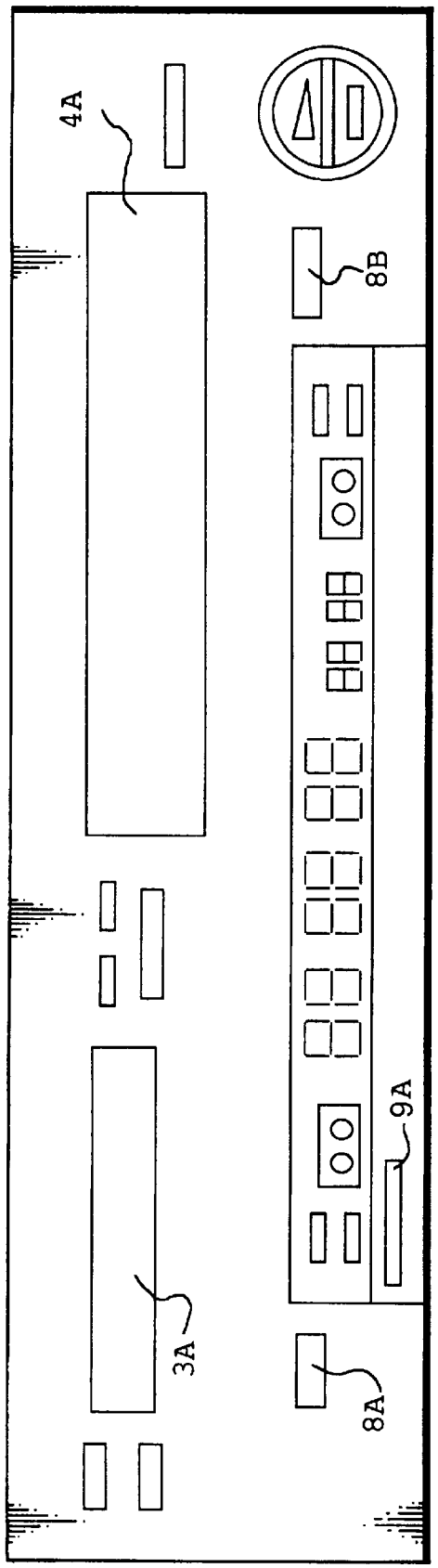
FIG. 2 is a schematic diagram showing a panel surface of the magnetic tape recording and reproducing apparatus for the video signal according to the embodiment of the present invention.

An embodiment of a magnetic tape recording and reproducing apparatus for a video signal according to the present invention will hereinafter be described with reference mainly to FIG. 1 and secondarily to FIG. 2. FIG. 1 is a block diagram showing a circuit of the embodiment of the magnetic tape recording and reproducing apparatus for the video signal. FIG. 2 is a diagram showing a panel surface of the magnetic tape recording and reproducing apparatus. Reference numerals 3, 4 respectively denote one magnetic tape recording and reproducing deck for a video signal (VTR deck) and the other magnetic tape recording and reproducing deck for a video signal (VTR deck). In this embodiment, the magnetic recording and reproducing decks 3, 4 are an 8-mm VTR deck and a VHS-system VTR deck, respectively. FIG. 2 shows a panel surface of a magnetic tape recording and reproducing apparatus for a video signal according to the embodiment. As shown in FIG. 2, a cassette slot 3A for a 8-mm tape cassette and a cassette slot 4A for a VHS tape cassette are formed on the panel surface (a lid is provided at each of the cassette slots 3A, 4A and is opened when a cassette is loaded into a cassette housing portion, not shown). Both of the VTR decks may be 8-mm VTR decks or may be VHS-system VTR decks. In short, the VTR decks may be VTRs of any system. When one of the VTR decks 3, 4 supplies a reproduced signal to the other thereof, the dubbing or electronic edition can be carried out though connection lines therefor between the VTR decks 3, 4 (not shown in FIG. 1). The magnetic tape recording and reproducing apparatus for the video signal may have three VTR decks or more.

Tuners 1, 2 capable of receiving the same ground-wave television broadcasting are provided so as to correspond to the VTR decks 3, 4, respectively. Each of these tuners 1, 2 can receive a television broadcasting of channels 1 to 62. While, in the arrangement shown in FIG. 1, the VTR deck 3 can record a television broadcasting signal received by the tuner 1 and the VTR deck 4 can record a television broadcasting signal received by the tuner 2, the signals received by the tuners 1, 2 may be switched by a switching means and supplied to the VTR decks 3, 4.

A tuner control circuit 5 having a CPU controls a channel selection of the tuners 1, 2 and also controls the switching of changeover switches 8, 9 which will be described later on. The tuners 1, 2 have the same arrangement. For example, each of the tuners 1, 2 has a phase-locked loop (PLL) local oscillator for respective channels 1 to 62 ranging from a VHF band to a UHF band, thereby local-oscillated signals from the PLL local oscillators being mixed by a mixer (not shown) with received high-frequency signals to obtain intermediate-frequency signals. The tuner control circuit 5 has a data of a frequency dividing ratio of a frequency divider of the PLL local oscillator with respect to each channel, the data being commonly used for the tuners 1, 2 to select the channels 1 to 62.

When the tuner 1 or 2 receives the television broadcasting of, for example, channel 1, the tuner control circuit 5 supplies an enable signal, a clock signal and a data of a frequency dividing ratio to the PLL local oscillator of the tuner 1 or 2, for the tuner 1 or 2 to receive the television broadcasting of channel 1. The tuner control circuit 5 receives from the tuner 1 or 2 a horizontal synchronizing signal and an automatic fine tuning (AFT) signal which are obtained thereat from the reception of the television broadcasting of channel 1. The tuner control circuit 5 discriminates a reception state of the tuner 1 or 2. If it is determined that the reception state is satisfactory, then the turner control circuit 5 sets the frequency dividing ratio as it is. If it is determined that the reception state is not satisfactory, the tuner control circuit 5 changes the frequency dividing ratio to be supplied to the tuner 1 or 2 until the reception state becomes satisfactory. During this channel selection, the tuner control circuit 5 supplies an audio muting control signal to the tuner 1 or 2.

Further, the tuner control circuit 5 receives from the tuner 1 or 2 a discrimination signal indicating that a sound of the television broadcasting of channel 1 is a stereophonic or bilingual sound or neither of them, and then supplies a display control signal to a display controller 13 which will be described later on. The tuner control circuit 5 stores in a non-volatile memory 6 the latest data of the frequency dividing ratio used when the reception state on channel 1 is satisfactory, of the data, which are commonly used for the tuner 1, 2, of the frequency dividing ratio of the PLL local oscillator for channels 1 to 62 of the television broadcasting. Upon channel scanning for selection, the tuner control circuit 5 stores in the non-volatile memory 6 the latest data of the frequency dividing ratio used when the reception state on a certain channel of the television broadcasting is satisfactory, of the data, which are commonly used for the tuners 1, 2, of the frequency dividing ratio of the PLL local oscillator.

Such channel selection is carried out based on a channel-selection control signal supplied from a control-signal generator 7 to the tuner control circuit 5. The control-signal generator 7 is formed of switches operated by a channel selection button or a channel scanning button, and also of a remote controller, a receiver for receiving a control signal (infrared-ray signal) from the remote controller, and a decoder, for the above channel selection. Similarly to the above buttons, the control-signal generator 7 is provided with operation buttons for energizing/de-energizing, a sound volume, and a sound quality, and for normal playback mode, fast forward mode, rewind mode, recording mode, stop mode and so on of the VTR decks 3, 4. A signal from the control-signal generator 7, used for controlling modes of the VTR decks 3, 4, is supplied to a system control apparatus (having a CPU) 15 for controlling the VTR decks 3, 4 and other units.

The control-signal generator 7 also includes a switch for switching a changeover switch 8 under the control of the tuner control circuit 5 and depending upon which of selection buttons 8A or 8B, shown in FIG. 2 (their equivalents are provided in the above remote controller) has been pressed; and a switch for switching a changeover switch 9 under the control of the tuner control circuit 5 depending on the setting of a sliding switch actuator 9A.

The changeover switches 8, 9 will be described on the assumption that a reproduced signal from the VTR deck 3, a signal obtained by monitoring the recording of the television signal received by the tuner 1, and the television signal received by the tuner 1 are a first video signal (a color video signal or monochrome video signal each including an audio signal) and that a reproduced signal from the VTR deck 4, a signal obtained by monitoring the recording of the television signal received by the tuner 2, and the television signal received by the tuner 2 are a second video signal (a color video signal or monochrome video signal each including an audio signal). The changeover switch 8 serves to switch the first and second video signals respectively supplied to its fixed contacts 8a, 8b and to supply the video signal obtained at its movable contact 8m to a synthesizer (adder) 12. The synthesizer 12 synthesizes a signal indicative of a channel, a signal indicating that a television broadcasting being received is stereophonic or bilingual broadcasting, a signal indicative of which of the VTR decks 3, 4 is used, a signal indicative of a blue background used for muting the video signal when there is no television broadcasting on a received channel, and so on, all of which are supplied from a display signal generator 14 including a character generator. The synthesizer 12 supplies the synthesized video signal to an output terminal 11. A synthesizing operation of the synthesizer 12 is to substitute a display signal or a signal indicative of a blue background for a part of the supplied video signal. A display controller 13 supplies a display control signal to the display signal generator 14 under the control of the tuner control circuit 5.

In the magnetic tape recording and reproducing apparatus for a video signal according to the embodiment, the operation buttons provided in the main body thereof for channel selection of the tuner 1, 2, a sound volume control, a sound quality control, mode selection of the VTR decks 3, 4 or corresponding operation buttons provided in the remote controller are commonly used for the tuners 1, 2 and the VTR decks 3, 4. It is determined under the control of the tuner control circuit 5 whether a channel of the tuner 1 or 2 or the like is selected and whether a mode of the VTR deck 3 or 4 is operated. It is determined depending upon which of the first and second video signals the changeover switch 8 is switched to select. Accordingly, a system control apparatus 15 is controlled based on the control signal from the tuner control circuit 5, and controls a mode operation of one of the VTR decks 3, 4.

The changeover switch 9 switches the first and second video signals respectively supplied to its fixed contacts 9a, 9b and the synthesized video signal from the synthesizer 12 supplied to its fixed contact 9c to supply the video signal obtained at its movable contact 9m to an output terminal 10. The output terminals 10, 11 are connected to monitor apparatus (television receivers) for monitoring pictures.

In this embodiment, a satellite broadcasting tuner may be added to record a received signal therefrom by the VTR decks 3, 4.

According to the first aspect of the present invention, since the magnetic tape recording and reproducing apparatus for a video signal includes the first and second VTR decks 3, 4 and the first and second tuners for receiving a ground wave, it is possible to obtain the magnetic tape recording and reproducing apparatus for a video signal which can record the ground-wave television broadcasting of different channels on different magnetic tapes and can prevent the change of the reception channel at one of the VTR decks 3, 4 from affecting the reception channel of the other thereof. According to the magnetic tape recording and reproducing apparatus for a video signal, it is possible to simultaneously record the television broadcasting of the same channel by the VTR decks 3, 4. Moreover, according to the magnetic tape recording and reproducing apparatus for a video signal, while one of the VTR decks 3, 4 is recording one of the signals received by the first and second television tuners 1, 2 for receiving the ground wave, it is possible for the user to optionally select any reception channel of the other of the ground-wave tuners 1, 2 and monitor the same.

According to the second aspect of the present invention, since the above magnetic tape recording and reproducing apparatus for a video signal includes a channel selection control means for commonly controlling the first and second ground-wave television tuners 1, 2 and the storage means for storing the channel data commonly used for the first and second ground-wave television tuners 1, 2, it is possible to, in addition to the effect of the first aspect of the present invention, prevent provision of a pair of television tuners for receiving a ground wave from complicating the arrangement thereof considerably.

According to the third aspect of the present invention, since the magnetic tape recording and reproducing apparatus for a video signal according to the second aspect of the present invention employs the channel data which are the frequency dividing ratio data of the programmable frequency dividers of the PLL local oscillators for respective channels of the first and second television tuners 1, 2 for receiving the ground wave, in addition to the effect of the second aspect of the present invention, increase of the tuners is prevented from consequently increasing the time required for storing the data.

According to the fourth aspect of the present invention, since the magnetic tape recording and reproducing apparatus for a video tape according to the first aspect of the present invention includes the mode operation means commonly used for the first and second VTR decks 3, 4 and the channel selection operation means commonly used for the fist and second television tuners 1, 2 for receiving the ground wave, in addition of the effect of the first aspect of the present invention, the operation means for mode operation and channel selection are prevented from being increased although the two VTR decks 3, 4 and the two tuners 1, 2 are provided.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A magnetic tape recording and reproducing apparatus for a video signal comprising:

first and second magnetic tape recording and reproducing decks for a video signal;

first and second television tuners for receiving a ground wave;

first and second switching means each selectively connected to the first and second magnetic tape recording and reproducing decks, wherein said second switching means switches one of a first video signal and a second video signal which are received by the first and second television tuners or are reproduced by the first and second magnetic tape recording and reproducing decks, and an output of said first switching means;

first output means connected to the first switching means for outputting signals to first monitor means;

second output means connected to the second switching means for outputting signals to second monitor means;

channel selection control means for commonly controlling said first and second television tuners for receiving a ground wave, said channel selection control means including means for receiving a horizontal synchronizing signal and an automatic fine tuning signal from said first or second television tuner so as to enable the channel selection control means to determine whether the reception state of a selected channel is satisfactory or non-satisfactory, and to receive channel data wherein said received channel data is the latest channel data determined by the satisfactory reception state of a selected channel by said channel selection control means and said channel data is frequency dividing ratio data of programmable frequency dividers of phase locked loops (PLL), said phase locked loops forming local oscillators for respective channels of said first and second television tuners for receiving a ground wave;

said first switching means being controlled by said channel selection control means for switching one of the first video signal and the second video signal depending upon which of a first selection button and a second selection button is pressed;

third switching means for controlling said second switching means when said third switching means is set said second switching means being controlled by said channel selection control means when said third switching means is not set; and storage means for storing said latest channel data commonly used for said first and second television tuners for receiving a ground wave.

2. A magnetic tape recording and reproducing apparatus for a video signal according to claim 1, further comprising common means for establishing operating modes of said first and second magnetic tape recording and reproducing decks; and common channel selection operation means for said first and second television tuners for receiving a ground wave.

3. A magnetic tape recording apparatus for a video signal according to claim 1, wherein said first and second switching means are comprised of first and second changeover switches.

4. A magnetic tape recording and reproducing apparatus for a video signal according to claim 3, wherein said first changeover switch is a two position movable switch for switching a video signal.

5. A magnetic tape recording and reproducing apparatus for a video signal according to claim 3, wherein said second changeover switch is a three position movable switch for switching a video signal.

6. A magnetic tape recording and reproducing apparatus for a video signal according to claim 3, further comprising:

a synthesizer for synthesizing from said channel selection control means a signal indicative of a channel, a signal indicative of whether a channel is stereophonic or bilingual, a signal indicative of which magnetic tape recording and reproducing tape deck is used, and a signal indicative of a blue background for muting the respective video signal when no channel is received.

7. A magnetic tape recording and reproducing apparatus for a video signal according to claim 3, wherein said first and second changeover switches select the first video signal or the second video signal and a synthesized video signal, the first video signal or the second video signal, respectively supplied thereto.

* * * * *